US010293943B1

(12) United States Patent
Pozzi et al.

(10) Patent No.: US 10,293,943 B1
(45) Date of Patent: May 21, 2019

(54) SEAT BACK POCKET SPRING AND METHOD

(71) Applicant: B/E Aerospace, Inc., Wellington, FL (US)

(72) Inventors: Alexander Pozzi, Winston-Salem, NC (US); Randall Bryce Liposky, Winston-Salem, NC (US); Fabio Anello, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 222 days.

(21) Appl. No.: 15/599,138

(22) Filed: May 18, 2017

Related U.S. Application Data

(60) Provisional application No. 62/337,950, filed on May 18, 2016.

(51) Int. Cl.
*A47C 7/62* (2006.01)
*B64D 11/06* (2006.01)

(52) U.S. Cl.
CPC ................................ *B64D 11/0627* (2014.12)

(58) Field of Classification Search
CPC ..... B64D 11/0638; B64D 11/06; A47B 46/00; A47B 1/05; A47B 2021/0335; A47B 46/005; A47B 21/03; A47B 23/00; A47B 5/04; A47B 88/407; B60N 3/004; B60N 3/00; B60N 3/002; B60N 2002/905; B60R 2011/0082; B60R 2011/0015
USPC ..... 297/163, 188.05, 188.01; 248/447.1, 447
See application file for complete search history.

(56) References Cited

U.S. PATENT DOCUMENTS

| | | | | |
|---|---|---|---|---|
| 6,698,701 B1 * | 3/2004 | Dalton | A47F 5/0869 | 248/222.12 |
| 7,651,160 B2 * | 1/2010 | Okumura | B60N 3/004 | 108/42 |
| 8,702,163 B2 * | 4/2014 | Westerink | B60N 3/004 | 297/146 |
| 9,422,059 B2 * | 8/2016 | Martinak | B60N 3/004 | |
| 2011/0187163 A1 * | 8/2011 | Westerink | B60N 3/004 | 297/163 |
| 2012/0038199 A1 * | 2/2012 | Matsumoto | B60N 2/4228 | 297/452.18 |
| 2012/0241572 A1 * | 9/2012 | McClain | B60N 3/004 | 248/220.21 |
| 2016/0167587 A1 * | 6/2016 | Dry | B60R 11/02 | 224/275 |
| 2018/0079369 A1 * | 3/2018 | Catlin | B60R 11/0241 | |

* cited by examiner

*Primary Examiner* — Chi Q Nguyen
(74) *Attorney, Agent, or Firm* — Clements Bernard Walker PLLC

(57) ABSTRACT

In an illustrative embodiment, an aircraft seatback pocket spring provides a pre-loaded spring force for holding the pocket closed. The pocket spring may include a length of a wire extending between inner surfaces of frame members on either side of the seat and forming an upper edge of the pocket. Second lengths of wire may extend from ends of the first length of wire in a vertical direction to form side edges of the seatback pocket. Coils may be formed at each end of the second lengths of wire and may be mounted to receiving elements provided on inner surfaces of the frame members. Extension members extending from the coils may contact a contact point on the same or proximate frame members to maintain the pre-loaded spring force on the coils.

16 Claims, 15 Drawing Sheets

SEAT BACK POCKET SPRING AND METHOD

RELATED APPLICATIONS

This application claims priority to U.S. Provisional Patent Application Ser. No. 62/337,950, entitled "Seat Spreader-Mounted Seat Back Pocket Spring and Method," filed May 18, 2016, which is herein incorporated by reference in its entirety.

BACKGROUND

In conventional implementations of seatback literature pockets for aircraft seats, a pocket spring is attached to seatback frame. The pocket spring may include coils affixed to each side of the seatback frame with fore-and-aft orientation in which the coils face fore-and-aft with a fore-and-aft center axis. Coils of the pocket spring are normally pre-loaded during assembly and installation of the seatback pocket such that when the seatback pocket is closed, the pocket spring holds the seatback pocket in the closed position. To open the seatback pocket in order to access items within the pocket or insert items into the pocket, a passenger pulls the pocket away from the seatback frame, which extends and engages the pocket spring. When the passenger releases the seatback pocket, the pre-loading of the pocket spring causes the seatback pocket to snap back and remain in the closed position.

Due to aircraft cabin space saving design considerations for providing additional aircraft cabin space for additional legroom for passengers and/or additional rows of seats to be added into the cabin, attaching the pocket spring to the seatback frame may cause the seatback pocket to take up more space than is desirable, which makes designing the spring loading characteristics of the pocket springs more difficult. In addition, because the pocket spring is attached to the seatback frame, conventional springs require sufficient material to bridge the distance between the coils and the attachment points on the back frame, which adds additional cost to the manufacturing of the spring as well as additional weight to the aircraft seat to which the pocket spring is mounted.

SUMMARY OF ILLUSTRATIVE EMBODIMENTS

The forgoing general description of the illustrative implementations and the following detailed description thereof are merely exemplary aspects of the teachings of this disclosure, and are not restrictive.

The present disclosure is directed to a design of a pocket spring for seatback pockets of aircraft seats that may be mounted on either end to a respective static element of the passenger seat. For example, the static element may be a portion of the seat carriage assembly, such as a seat spreader, seat leg, or a lateral beam extending between passenger seats of a passenger seating group. In certain embodiments, a seatback pocket for an aircraft passenger seat may include a pocket spring that provides a pre-loaded spring force for holding the seatback pocket in a closed position against a rear surface of a seatback. The pocket spring may include a first length of a wire that extends vertically above and between inner surfaces of a pair of static elements on either side of the seat in a substantially horizontal direction and forming an upper edge of the seatback pocket. A pair of second lengths of wire may extend from respective ends of the first length of wire in a substantially vertical direction to the respective static elements to form side edges of the seatback pocket. A pair of coils may be formed at ends of the second lengths of wire, which are mounted to a respective receiving element on a respective inner surface of the pair of static elements such that an axis of the pair of coils is aligned horizontally and perpendicularly to the inner surfaces of the pair of static elements. A pair of extension members may extend from each of the coils that contact a complementary contact point on the inner surfaces the static elements to maintain the pre-loaded spring force on the coils. A pocket panel may cover and enclose the pocket spring to form a pocket portion of the seatback pocket that holds one or more items within the pocket panel.

These and other objects and advantages of the invention are achieved by providing seat back pocket spring for an aircraft passenger seat that includes a u-shaped metal spring for extending laterally between two spaced-apart static elements of a passenger seat. The spring includes, proximate a first end and proximate an opposing second end, a number of concentric attachment coils defining a center axis extending laterally from the first end of the spring to the second end of the spring, and an integral bridge connecting the first end and the second end.

In some implementations, the configuration of the horizontally and perpendicularly mounted pocket spring uses less material than conventional pocket springs that are mounted to the seatback frame, which may reduce an overall weight of the aircraft seat. In addition, mounting the pocket spring to a static element on either side of the passenger seat carriage assembly rather than to the seatback frame may increase an amount of clearance space between adjacent rows of aircraft seats, which provides additional legroom for passengers and/or allows additional rows of seats to be added to the aircraft.

In some implementations, the coils have a stronger resistance than that of a conventional pocket spring. For example, because the coils as described herein are mounted perpendicular to movement of travel of the seatback pocket and generally parallel to the seat back of the passenger seat, as well as having an increased number of loops as opposed to the single loop coil of the conventional pocket spring, the pocket spring coils are capable of greater range of displacement from the seatback than the conventional pocket spring. In one example, the pocket spring may allow the pocket to be moved up to twice as far from the seatback while retaining return strength. For example, unlike conventional pocket springs, the pocket spring as described herein may retain strength and durability when used to hold larger and heavier items within the seatback pocket, such as, in a particular example, multiple hardcover text books.

Additionally, in some implementations, the return strength described above may continue for a longer life span than conventional pocket springs. In the conventional pocket spring having a single loop, there is a single stress point at the bottom of the coil for a single point of degradation and damage over time. The pocket spring as described herein, conversely, includes a number of loops within the coil (e.g., three in a preferred embodiment), allowing the stress point to spread out between the individual loops of the coils. Because mechanical stress is distributed in the pocket spring, the pocket spring as described herein will be longer lasting as well as more durable than conventional pocket springs.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
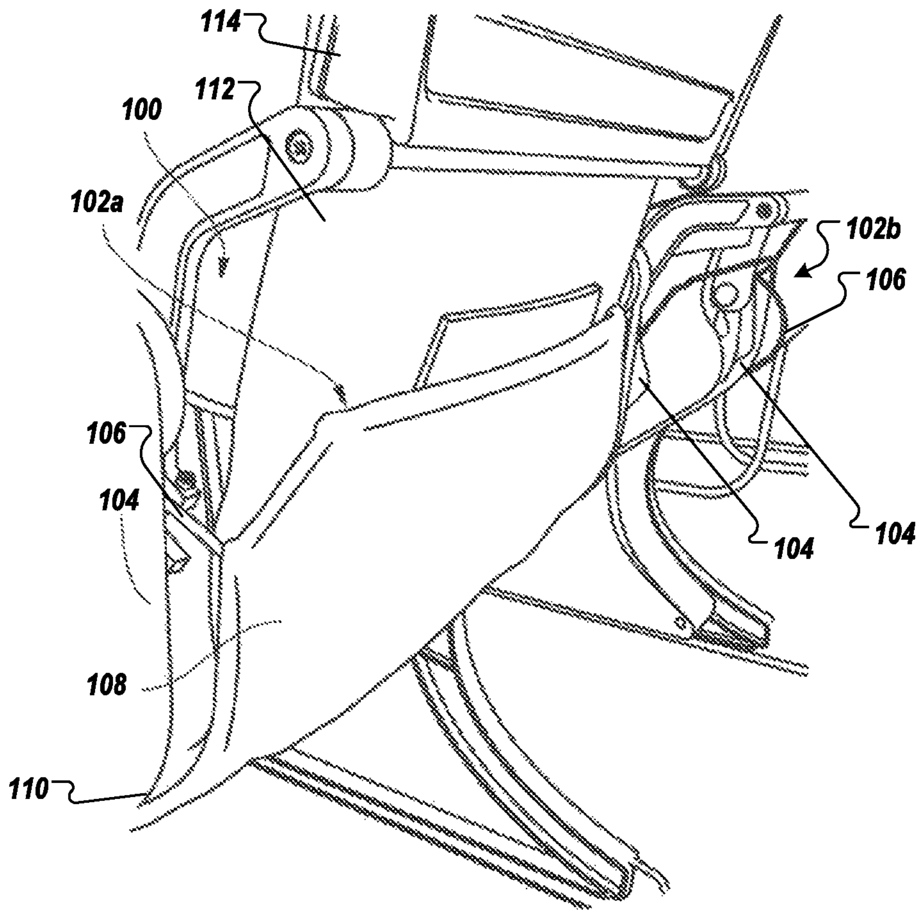
FIG. 1 is a fragmentary perspective view of an aircraft passenger seat back with a seat back pocket utilizing an example spring in accordance with the disclosure of this application.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to a spreader-mounted pocket spring of a seatback literature pocket for an aircraft passenger seat, which can include but is not limited to, economy class, premium economy class, and business class seats. In contrast to conventional pocket designs, the pocket spring described herein may mount to a pair of static elements, such as the spreaders on either side of a frame of the aircraft seat and may be symmetric about a centerline between the pair of static elements, which may correspond to a centerline of the aircraft seat. In some implementations, each side of the pocket spring that is mounted to a respective static element may include a number turns of the coils that wrap axially around a receiving element affixed to an inner surface of the static element to provide spring force for maintaining the seatback literature pocket in a closed position where the pocket lies flat against a rear surface of the aircraft seat. The receiving element, for example, may be a bushing, bearing, or other protrusion extending from the static element and configured to receive coils. In some examples, the number of spring coils that wrap around each of the receiving elements can vary based on a gauge of the wire, a height of the pocket, and an amount of desired spring force. In addition, the axes of the coils wrapped around the receiving elements may be aligned horizontally and perpendicularly to the face of the static elements such that the coils act as torsion-spring coils.

During assembly of the seatback pocket on the aircraft seat, the pocket spring may be spring loaded so that the pocket spring returns to its original shape after the pocket spring has been stretched when the seatback pocket is opened. In some implementations, the configuration of the horizontally and perpendicularly mounted pocket spring uses less material than conventional pocket springs that are mounted to the seatback frame, which may reduce an overall weight of the aircraft seat. In addition, mounting the pocket spring to the static elements on either side of the aircraft seat rather than to the seatback frame may increase an amount of clearance space between adjacent rows of aircraft seats, which provides additional legroom for passengers and/or allows additional rows of seats to be added to the aircraft.

Turning now to the figures, FIG. 1 illustrates a perspective view of a portion of aircraft seats 100, which may include a seatback literature pocket 102 disposed on a rear surface of a seatback portion of the seat 100. In some examples, the seatback pocket 102 may include a pocket spring 106 affixed to static elements such as spreaders 104 on either side of the seat 100. In some implementations, the seatback pocket 102 may also include a pocket panel 108 that covers the pocket spring 106. For example, the illustration of FIG. 1 shows an example of a seatback pocket 102*a* covered by the pocket panel 108 as well as an example of a seatback pocket 102*b* with the pocket panel 108 removed to reveal the pocket spring 106 affixed to the spreaders 104 on either side of the seat 100.

In some implementations, the pocket panel 108 may be formed by a portion of the dress cover of the aircraft seat 100 and may be made of the same type of material as the material covering cushions for the seat bottom or seatback of the aircraft seat 100, such as leather, synthetic leather, or various types of synthetic or non-synthetic fabric blends. In some implementations, the pocket panel 108 may be slidingly inserted over the pocket spring 106 and affixed to a bottom surface of a seat bottom 110 such that a bottom portion of the dress cover of the pocket panel 108 is held shut so that items inserted into the seatback pocket 102 do not fall out when inserted into the pocket 102. In some implementations, the dress cover for the pocket panel 102 may be integral with a dress cover for a cushion of the seat bottom 110. In some implementations, the pocket panel 108 covers the pocket spring 106 such that the pocket spring 106 is positioned inside the pocket panel 108 that is wrapped around the pocket spring 106 or slidingly inserted over the pocket spring 106.

In some examples, the pocket panel 108 of the seatback pocket 102 may be held in a normally-closed position in which the pocket panel 108 lies substantially flat against a rear surface of the seatback 112 of the aircraft seat 100 and/or items contained within the seatback pocket 102 by the pocket spring 106 positioned inside the pocket panel 108 and attached to the static elements 104 on either side of the seat 100. In some examples, as discussed in further detail below, each side of the pocket spring 106 may be mounted to a respective static element 104 on each side of the seat 100 and may include a number of coils 218, 222 wrapped axially around a receiving element (e.g., bushing) 330 (FIGS. 3A-3D) affixed to an inner surface of each of the static elements 104 to provide spring force for maintaining the seatback pocket 102 in the closed position. In some examples, the number of spring coils 218, 222 that wrap around each of the receiving elements 330 can vary based on a gauge of the wire, a height of the pocket, and an amount of desired spring force. In addition, the axes of the coils 218, 222 wrapped around the receiving elements 330 may be aligned horizontally and perpendicularly to the face of the static elements 104 such that the coils 218, 222 function as torsion-spring coils as they expand and contract upon opening and closing of the seatback pocket 102. For example, as the seatback pocket 102 is opened by pulling the pocket panel 108 away from the rear surface of the seatback 112, the coils 218, 222 of the pocket spring 106 may extend under the pulling force applied to the pocket spring 106. To close the seatback pocket 102, the pocket panel 108 may be released, and the pre-loading of the coils 218, 222 of the pocket spring 106 during assembly causes the seatback pocket 102 to automatically spring back to the closed position. In some examples, a distance that the pocket spring 106 extends from the rear surface of the seatback 112 may be based on properties of the material that makes up the pocket spring 106, how the pocket spring 106 is pretreated, the number turns of the coils 218, 222 wrapped around the receiving members 330, and other characteristics of the pocket spring 106 discussed in details further below. In one example, the seatback pocket 102 may be able to extend away from the seatback about twice as far as a conventional pocket spring. In some examples, the pocket spring may be designed for repeated motion of ten to twelve inches' distance from the seatback. Throughout the disclosure, the horizontal and perpendicular mounting orientation of the coils 218, 222 of the pocket spring 106 onto the inner surfaces of the static elements 104 on either side of the aircraft seat 100 may be referred to as the pocket spring 106 being horizontally mounted to the static elements 104.

While the implementations of the pocket spring 106 illustrated herein show the coils 218, 222 disposed on either end of the pocket spring 106 mounted to inner surfaces of the static elements 104 below a tray table 114 mounted to the rear surface of the seatback 112 of the aircraft seat 100, it can be understood that the pocket spring 106 may also be mounted to connection points on other static elements of the aircraft seat 100 and/or within the aircraft cabin. For example, the pocket spring 106 may be part of a beverage pocket mounted above a deployed tray table 114 that is configured to hold a beverage container, such as a bottle or cup. For example, the pocket spring 106 in the beverage pocket example, may be mounted on a first side to an outer portion of the seatback frame and on a second side to an additional static element that is mounted to the seatback 112 of the aircraft seat 100 such that a distance between the mounting location of the first side of the pocket spring 106 and the mounting location of the second side of the pocket spring 106 may correspond to half or less than half of the width of the aircraft seat 100. In some implementations, the distance between the mounting locations of the static elements of the beverage pocket may be based on an average width of a beverage container that may be inserted into the beverage pocket. The pocket spring 106 may allow the beverage pocket to extend approximately six to eight inches from the rear surface of the seatback 112 to allow a beverage container to be inserted or removed from the pocket.

In other examples, the pocket spring 106 may also be mounted to other surfaces on the aircraft seat 100 or within the aircraft cabin. For example, the pocket spring 106 for a literature pocket may be mounted to static elements such as beams affixed to an interior panel of the aircraft fuselage, which may allow a passenger seated in an aircraft seat 100 adjacent to a fuselage window to have access a literature pocket on one side of the seat. In other examples, where the aircraft seat 100 is part of a premium class (e.g., first class, business class) aircraft suite that includes various privacy panels that separate the aircraft seat 100 from adjacent seats 100 and/or aircraft cabin aisles, additional pockets that include the pocket spring 106 may be mounted to static elements affixed to the privacy panels. In some implementations, the static elements to which the coils 218, 222 of the pocket spring 106 are mounted are stationary. However, in other examples, the coils 218, 222 may also be mounted to non-static elements that move (e.g., translate, rotate). For example, the pocket panel 106 for a storage pocket within an aircraft suite may be mounted to a frame for a sliding door panel.

Turning now to FIGS. 2A-2F, various views of a pocket spring 206 for a seatback pocket 102 of an aircraft seat 100 are illustrated. The pocket spring 206 may be an example of the pocket spring 106 described above. In some implementations, the pocket spring 206 may be formed of a single length of wire and may include first and second arms 202, 204 integrally connected by an intermediate bridge 216 that extends between the first and second arms 202, 204. In addition, when the pocket spring 206 is mounted to the static elements 104 on either side of the aircraft seat 100, the arms may extend in a substantially vertically upward from the mounting location of the coils 218, 222 to the receiving elements 330 on each of the static elements 104.

Figure 2A:
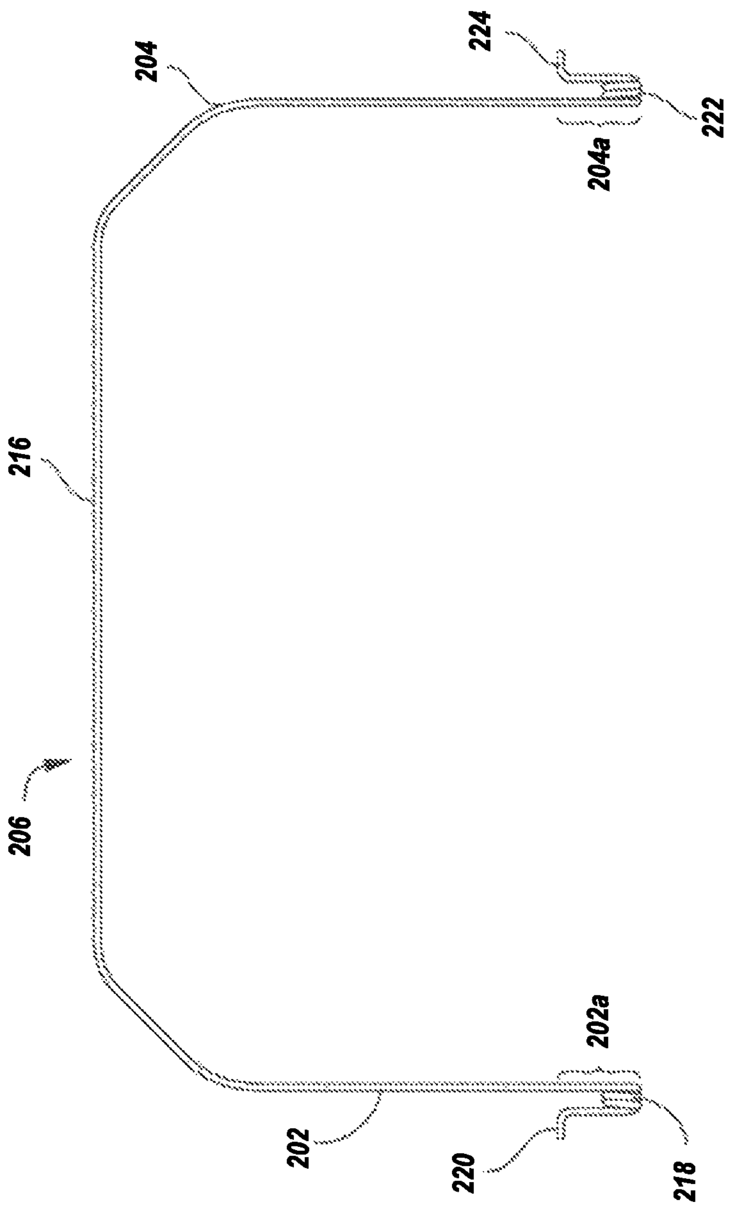
FIG. 2A is a forward plan view, looking aft, of an example pocket spring.

In some implementations, the intermediate bridge 216 may extend substantially horizontally between the first and second arms 202, 204 such that the intermediate bridge 216 forms an upper edge of the seatback pocket 102, and the first and second arms 202, 204 form side edges of the seatback pocket 102. For example, a passenger seated in an adjacent rear seat facing the seatback pocket 102, the pocket spring 206 may be oriented as shown in FIG. 2A, which illustrates a forward plan view facing aft of the pocket spring 206. When the seatback pocket 102 is opened, the passenger may pull the intermediate bridge 216 of pocket spring 206 away from the rear surface of the seatback 112, thereby actuating the coils 218, 222 disposed on each end of the first and second arms 202, 204. When the passenger releases the intermediate bridge 216 of the pocket spring 206, the pre-loading of the pocket spring 206 to the static elements 104 causes the pocket spring 206 to spring back to the closed position.

In some examples, the wire that makes of the pocket spring 206 may have a high tensile strength and may be composed of carbon steel or stainless steel, such as music wire, that is able to maintain its elasticity or spring-like properties when the pocket spring is in both the opened and closed positions. For example, due to the pre-loading of the pocket spring 206 that is performed when the seatback pocket 102 is assembled on the rear surface of the seatback 112 of the aircraft seat 100, the pocket spring 206 is not in a relaxed state when the seatback pocket 102 is in the closed position. In addition, the design criteria for the wire that makes up the pocket spring 206 may include a predetermined amount of elasticity or ductility that may ensure that the pocket spring 206 snaps back to the closed position without any deformation of the wire after repeated openings and closings of the seatback pocket 102.

In some implementations, each of the arms 202, 204 of the pocket spring 206 may include an end portion **202*a*, 204*a* that attaches to the static elements 104 on each side of the aircraft seat 100. In some examples, the end portion 202*a* for the first arm 202 may include a coil 218 with an extension member 220 that extends from the coil 218 on an end opposite from an end where the end portion 202*a* of the first arm 202 is formed into the coil 218. Similarly, the end portion 204*a* for the second arm 204 may include a coil 222 with an extension member 224 that extends from the coil 222 on an end opposite from an end where the end portion 204*a* of the second arm 204 is formed into the coil 222**.

Figure 2B:
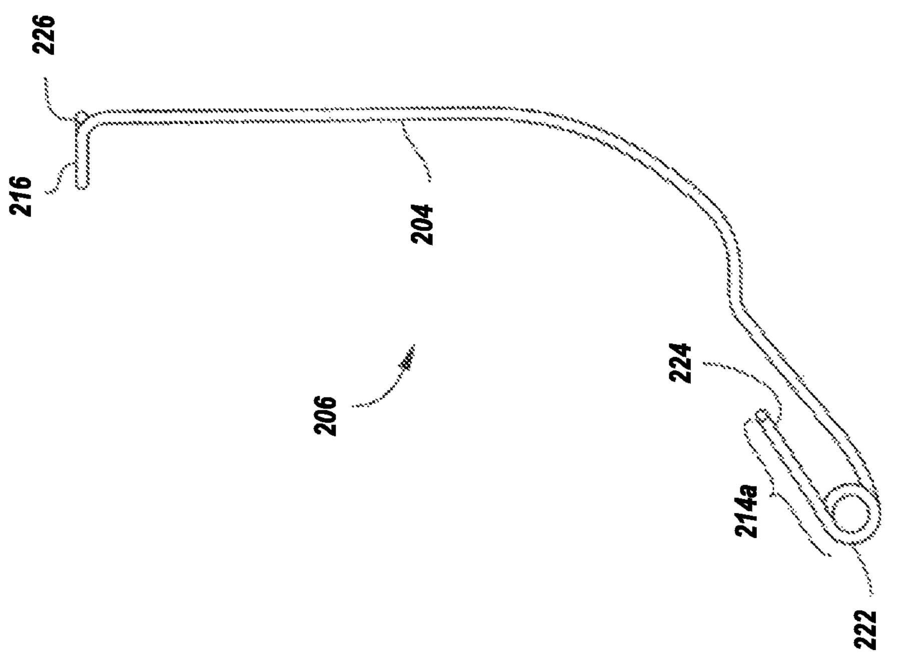
FIG. 2B is a side elevation of the pocket spring shown in FIG. 3.
Figure 2C:
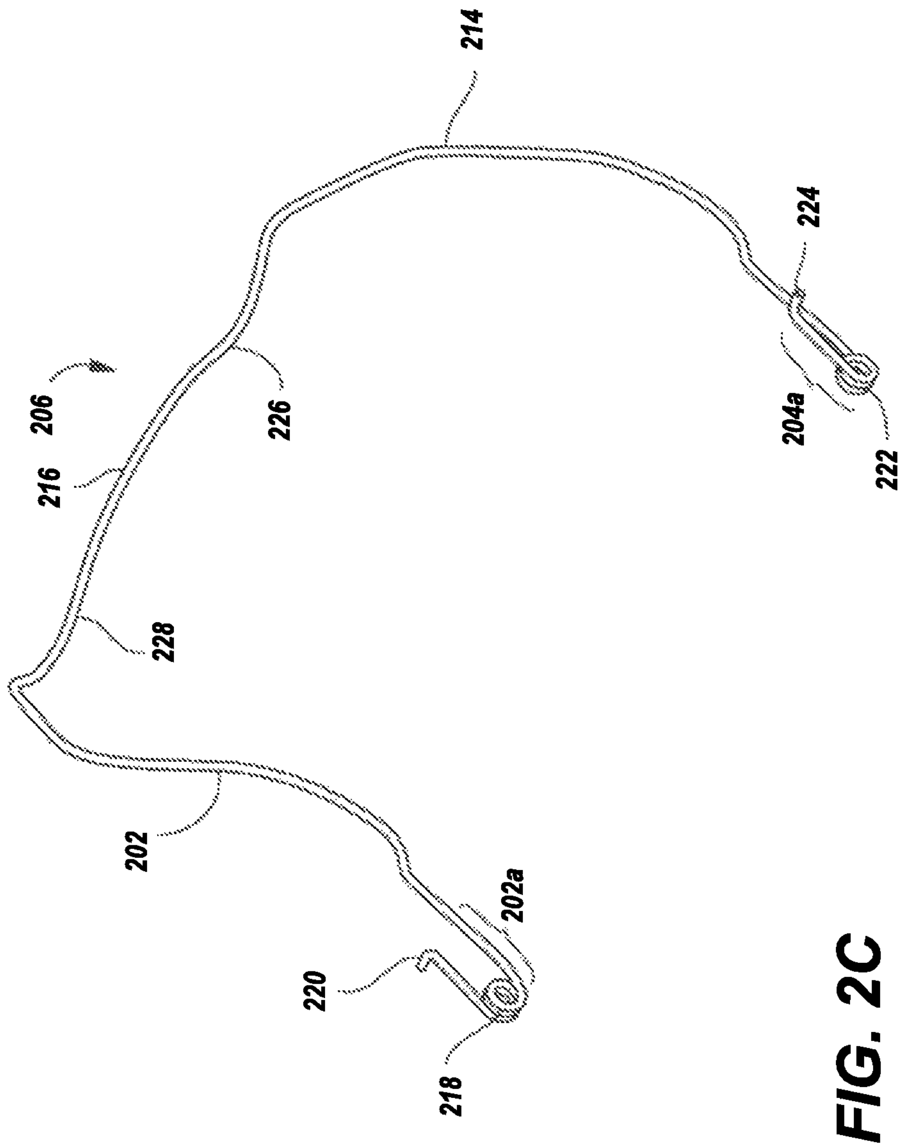
FIG. 2C is an isometric aft view, looking rearward, of the pocket spring shown in FIG. 2A.
Figure 2D:
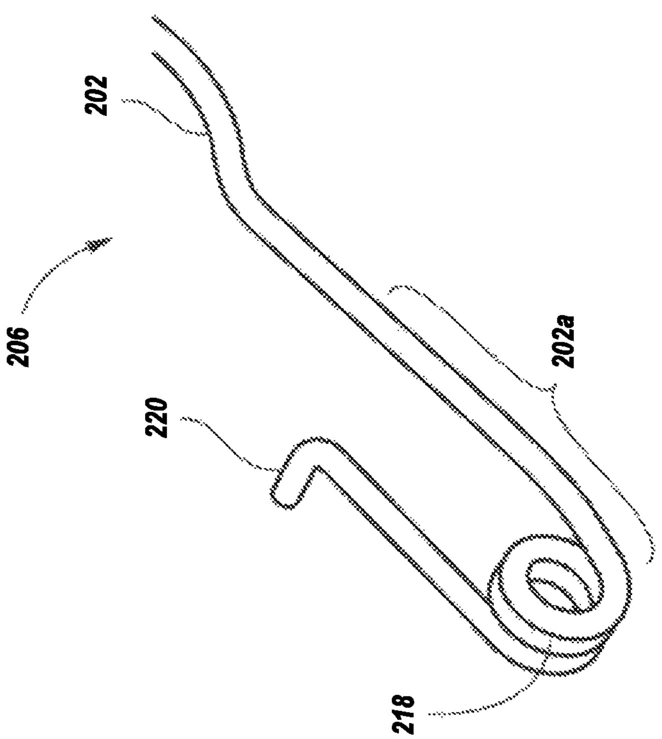
FIG. 2D is a fragmentary isometric view of the pocket spring of FIG. 2A showing the spring coils and extension member of one end of the spring.
Figure 2E:
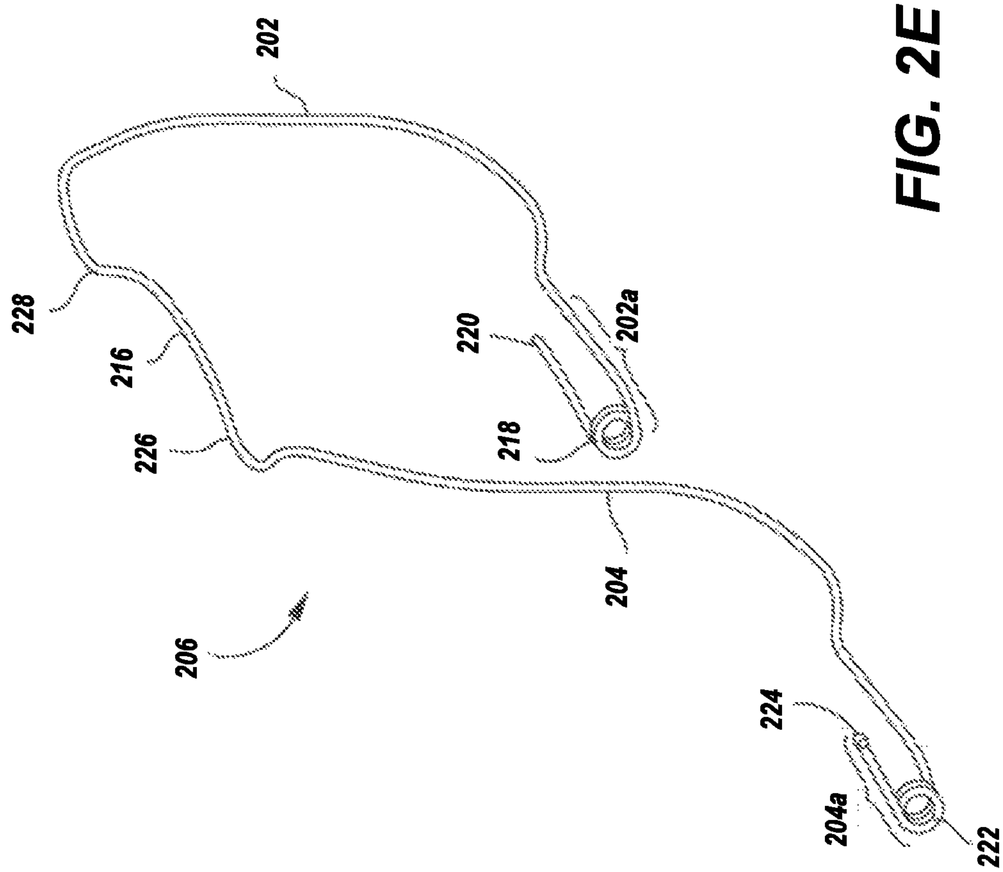
FIG. 2E is an isometric aft view, looking forward, of the pocket spring shown in FIG. 2A.

As is discussed further below, the extension members 220, 224 are configured to maintain contact with a contact point 302 (FIG. 3A) on or proximate the static elements 104, such as a complementary aperture, rib, groove, or slot disposed on an inner surface of the static elements 104 or proximate portion of the passenger seat carriage assembly into and/or against which the extension members 220, 224 are disposed in order to maintain the spring loading of the pocket spring 206 when the seatback pocket 102 is in the closed position. As best shown in FIGS. 2B and 2C, the first and second arms 202, 204 of the pocket spring 206 may be curved in such a way that that allows the extension members 220, 224 at each end of the pocket spring 206 to make contact with the contact point 302 on the inside surface of the static elements 104 such that the contact points 302 may serve to create a pre-load force on the pocket spring 206. In some examples, the first and second arms 202, 204 may be curved concave toward the passenger facing the seatback pocket 102 disposed on the rear surface of an adjacent aircraft seat 100 in front of the passenger.

In addition, the contact between the extension members 220, 224 and the contact points 302 on the static elements 104 may create an opposing moment to counteract the moment induced on the pocket spring 206 when the pocket spring 206 is pulled by a passenger when opening the seatback pocket 206. In some implementations, an amount of pre-load force exerted by the extension members 220, 224 at the contact points 302 on the inside surface of the static elements 104 may be based on a distance that each of the extension members 220, 224 extends from the coils 218, 214. For example, as a length of the extension members 220, 224 increases, an amount of pre-load force exerted by the extension members 220, 224 on the contact points 302 of the static elements 104 increases, which may increase a force with which the pocket spring 206 snaps back to the closed position upon release of the intermediate bridge 216 after the seatback pocket 102 has been opened to insert or remove items.

Figure 2F:
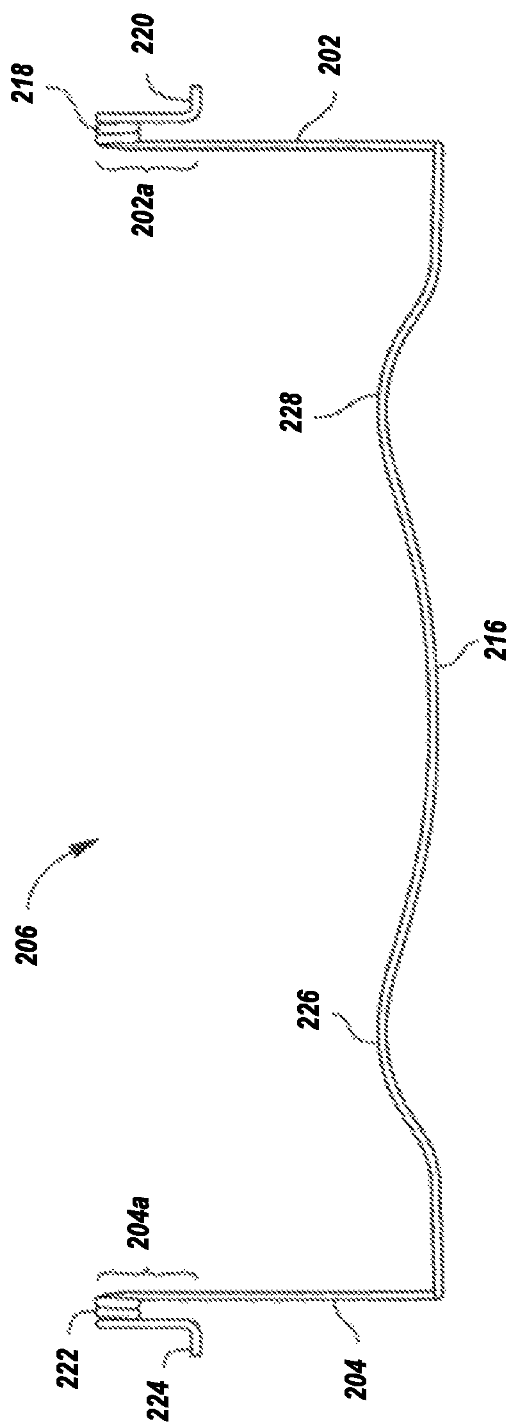
FIG. 2F is a top plan view, looking down, showing example knee-clearance areas.

Additionally, as shown, for example, in FIG. 2F, the intermediate bridge 216 may include bends 226, 228 which provide additional knee clearance areas for a passenger seated in a seat facing the seatback pocket 102 that includes the pocket spring 206. In one example, each of the bends 226, 228 may be curved concave toward a passenger facing the seatback pocket 102 disposed on the rear surface of an adjacent aircraft seat 100 in front of the passenger. In addition, the bends 226, 228 may be substantially equally spaced on either side of a centerline of the pocket spring 206 such that the bends 226, 228 may be approximately aligned with knees or legs of a passenger seated in an aircraft seat directly to the rear of the seatback pocket 102 that includes the pocket spring 206. In some implementations, the bends 226, 228 may increase a distance that the pocket spring 206 may be pulled away from the rear surface of the seatback 112 when opening the seatback pocket 102 due to the additional distance between the knees or legs of the passenger and the pocket spring 206 that is created by the bends 226, 228. For example, when the seatback pocket 102 is opened by pulling the seatback pocket 102 rearwardly away from the rear surface of the seatback 112, the bends 226, 228 in the intermediate bridge 216 may provide an additional distance that the seatback pocket 102 may be pulled away from the seatback 112 before the seatback pocket 102 makes contact with the knees or legs of the passenger.

Figure 3A:
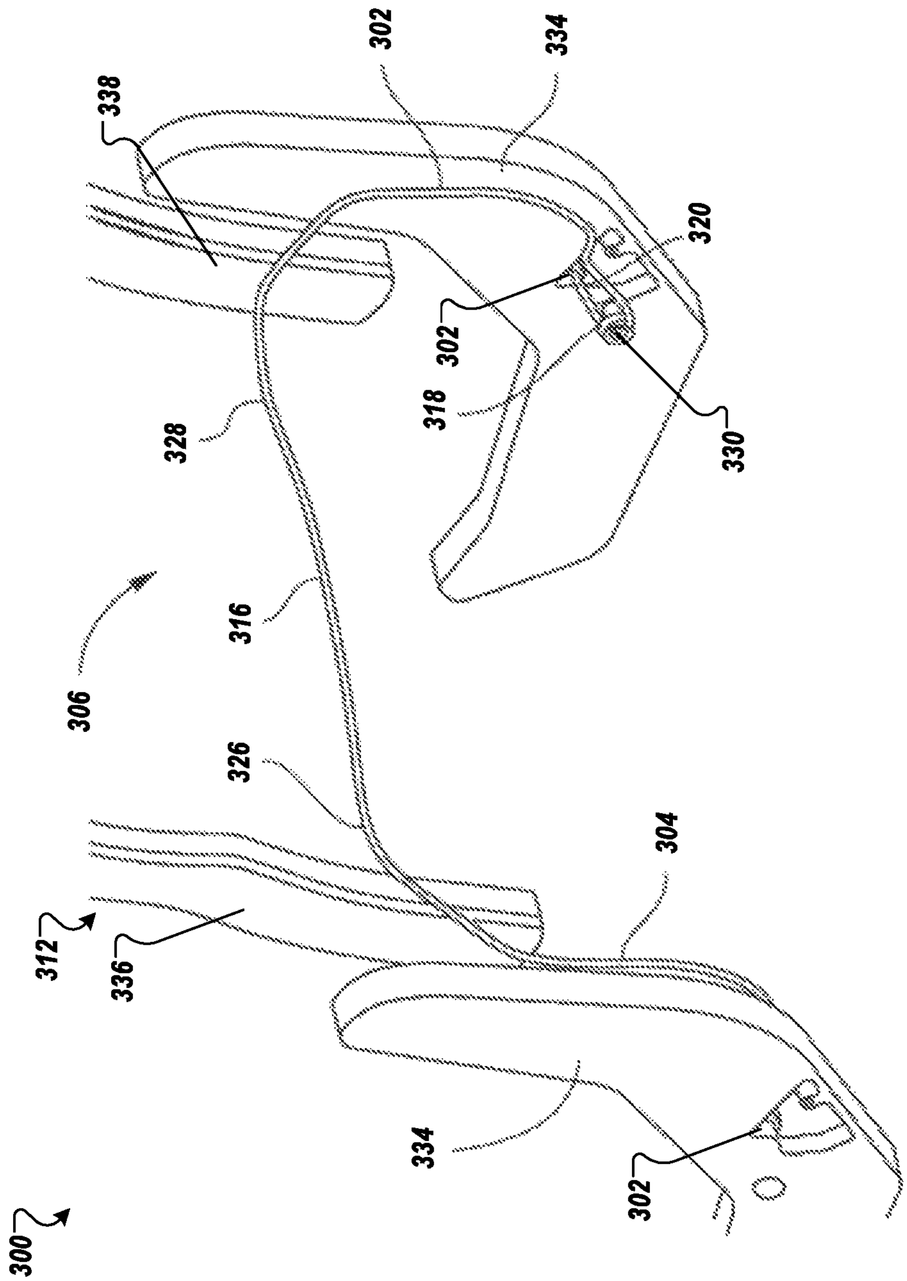
FIG. 3A is an isometric view of an example pocket spring attached to spreaders of an aircraft passenger seat.
Figure 3B:
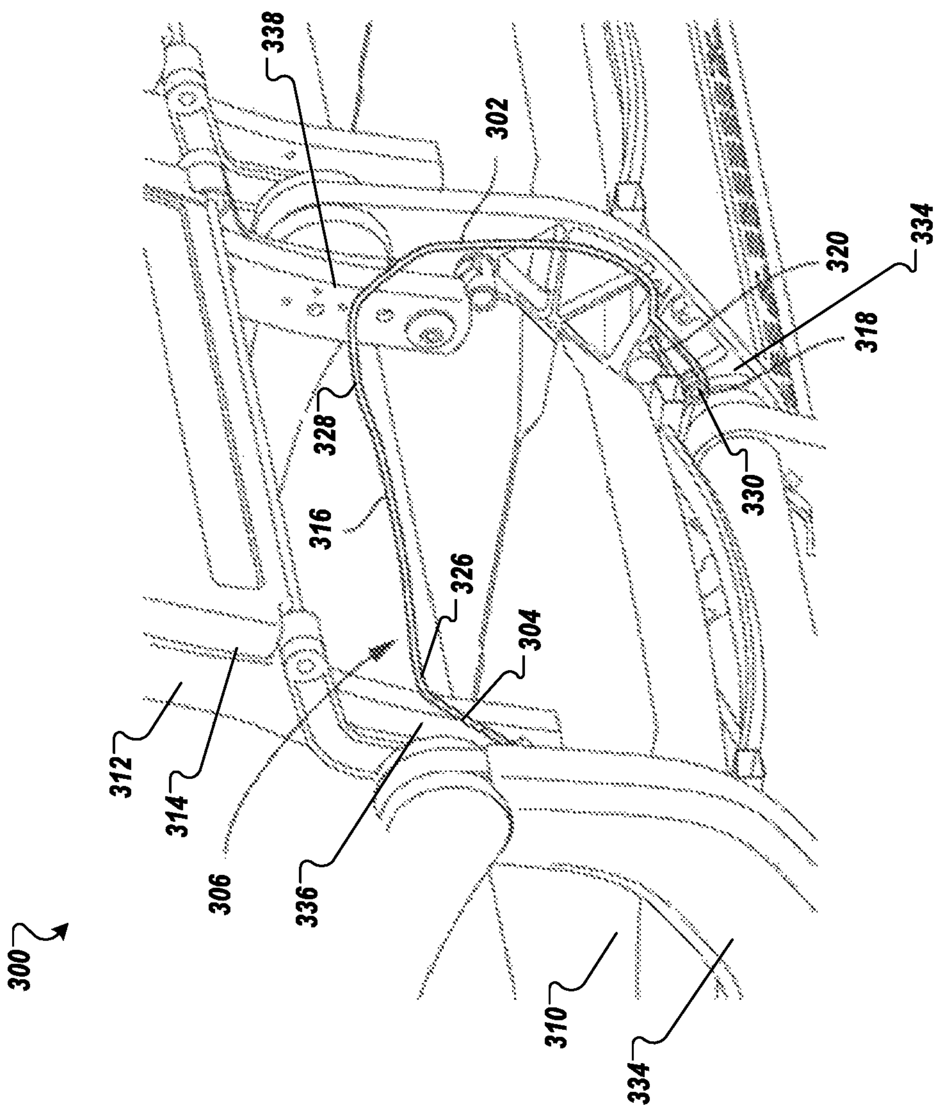
FIG. 3B is a fragmentary enlarged perspective view of an example pocket spring attached to spreaders of an aircraft passenger seat.
Figure 3C:
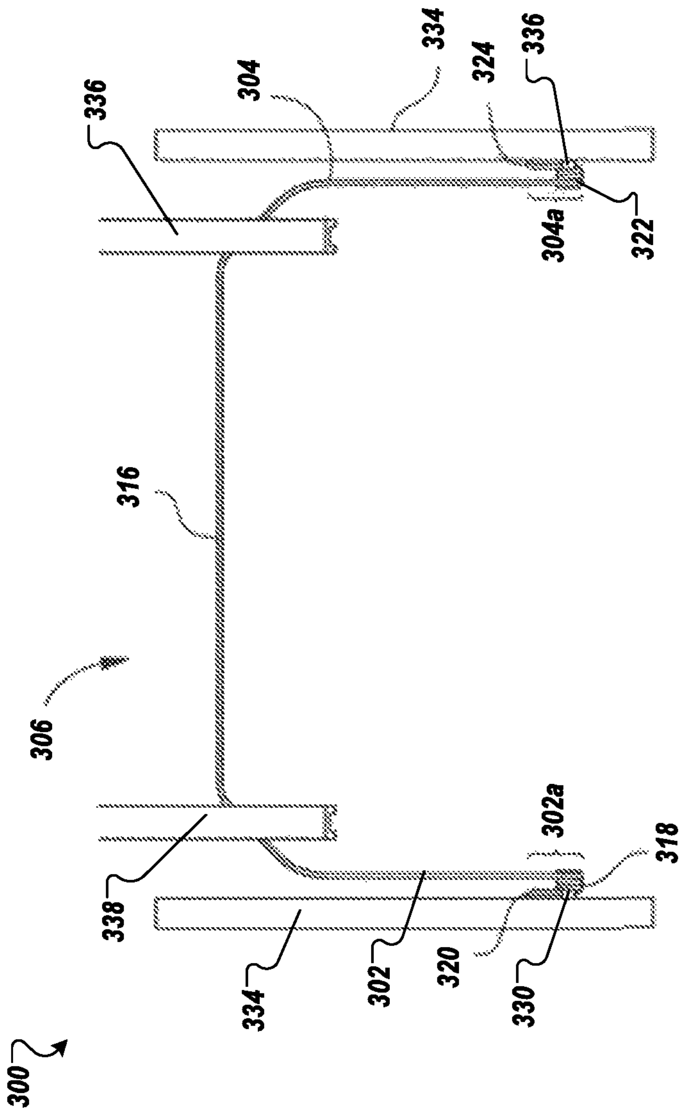
FIG. 3C is a forward plan view, looking aft, showing attachment of an example pocket spring to seat spreaders.
Figure 3D:
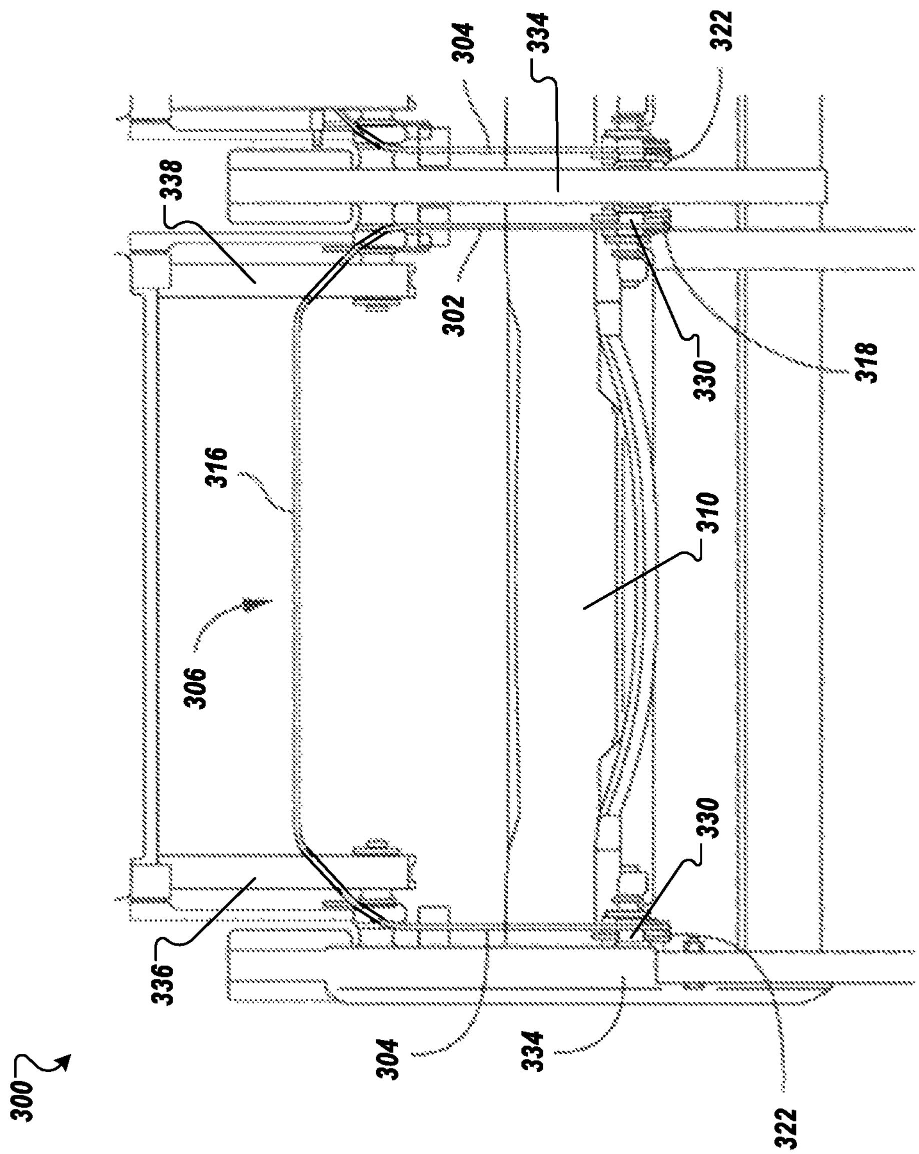
FIG. 3D is a fragmentary enlarged view an example pocket spring attached to spreaders of an aircraft passenger seat.

Turning to FIGS. 3A-3D, various views of a pocket spring 306 mounted to spreaders 334 of an aircraft seat 300 are illustrated. For example, FIG. 3A illustrates an isometric view of the pocket spring 306 attached to the spreaders 334, FIG. 3B illustrates a fragmentary enlarged perspective view of the pocket spring 306 attached to the spreaders 334 of the aircraft passenger seat 300, FIG. 3C provides a forward plan view, looking aft, showing attachment of the pocket spring 306 to seat spreaders 334, and FIG. 3D illustrates a fragmentary enlarged view the pocket spring 306 attached to spreaders 334 of the aircraft passenger seat 300.

In some examples, the pocket spring 306 may be an implementation of the pocket springs 106, 206 described above. For example, as shown in FIG. 3A, the pocket spring 306 may be attached to two laterally-spaced static elements, such as spreaders 334 on either side of the aircraft seat 300. In some implementations, the pocket spring 306 may be connected to receiving elements (e.g., bushings, bearings or other protrusions) 330 (one shown) mounted to inner surfaces of the spreaders 334 by the coils 318 and 322. In one example, the coils 318 and 322 may provide a majority of the spring force for the pocket spring 306 due to a preloading force applied to the pocket spring 306 by contact between extension members 320, 324 that extend from the ends of the coils 318, 322 on each side of the pocket spring 306 and contact points 302 formed on the inner surfaces of each of the spreaders 304.

In some examples, the contact points 302 may be complementary apertures, ribs, grooves, or slots that may be disposed on inner surfaces of the spreaders 334 into which the extension members 320, 324 on each side of the pocket spring are inserted to maintain the spring loading of the pocket spring 306 when the seatback pocket 102 (FIG. 1) is in the closed position. In some examples, the contact points 302 act as stops that halt motion of the pocket spring 306 that is recoiling from open position to the closed position. In some implementations, the axes of each of the coils 318, 322 may be aligned horizontally and perpendicularly to the inner surface of the spreaders 304 such that the coils 318, 322 act as torsion-spring coils. When attached to the spreaders 334, the pocket spring 306 may extend in an up-and-aft direction to form the outer side of the seatback pocket 102 (FIG. 1).

In some implementations, the pocket spring 306 may be formed of a single length of wire and may include first and second arms 302, 304 integrally connected by an intermediate bridge 316 that extends between the first and second arms 302, 304. In addition, when the pocket spring 306 is mounted to the spreaders 334 on either side of the aircraft seat 300, the arms may extend in a substantially vertically upward direction from the mounting location of the coils 318, 322 to the receiving elements 330 on each of the spreaders 334. In some implementations, the intermediate bridge 316 may extend substantially horizontally between the first and second arms 302, 304 such that the intermediate bridge 316 forms an upper edge of the seatback pocket 102. Additionally, the intermediate bridge 316 may include bends 326, 328 which provide additional knee clearance areas for a passenger seated in a seat facing the seatback pocket 102 that includes the pocket spring 306.

In addition, portions of the intermediate bridge 316 and/or first and second arms 302, 304 may rest against a first member 336 and a second member 338 that form an outer boundary of a lower portion of a seatback frame 312 of the aircraft seat 300 when the pocket spring 306 is in the closed position. In some examples, the first and second members 336, 338 extend below a seatback tray table 314 that rests against a rear surface of an upper portion of the seatback 312 when in the stowed position. When the seatback pocket 102 is opened, a passenger sitting to the rear of the aircraft seat 300 may grasp and pull the intermediate bridge 316 away from the first and second members 336, 338 and a seat bottom 310 of the aircraft seat 300. When the passenger releases the intermediate bridge 316, the pre-loading of the pocket spring 306 may cause the pocket spring to snap back to the closed position in which portions of the intermediate bridge 316 and/or first and second arms 302, 304 make contact with the first and second members 338 of the seatback frame 312.

In some implementations, the spreader-mounted pocket spring 306 for the seatback pocket 102 may be assembled and mounted to the spreaders 334 in various ways to ensure that the pocket spring 306 is in a pre-loaded condition when in the closed position resting against the first and second members 336, 338 of the seatback 312. In one example, the pocket spring 306 can be assembled having pre-loaded coils 318, 322 with the use of a tool such as a needle-like device that holds the coils 318, 322 in a pre-loaded condition as the coils 318, 322 are mounted to the receiving elements 330 affixed to the inner surface of the spreaders 334, and the extension members 320, 324. In another example, the extension members 320, 324 may be inserted into the contact points 302 on each of the spreaders 334 to preload the pocket spring 306, and then the coils 318, 322 may be pushed and secured onto the receiving elements 330 such that each of the coils 318, 322 wraps around and covers at least a portion of an outer surface of a respective receiving element 300 disposed on an inner surface of each of the spreaders 334.

In some implementations, the receiving elements 330*s* may be affixed to the inner surface of the spreaders 334 by fasteners such as a screw, nut, or bolt. In other examples, the receiving elements 330 may be formed onto to the static elements 334 during the manufacturing process by machining, casting, forging, or injection molding. In some implementations, the receiving elements 330 may have a generally cylindrical and/or circular shape in which an end of the cylindrical bushing may affixed to the inner surface of the spreader 334. The receiving elements 330, in some embodiments, are manufactured using a material that will not exhibit noisiness (e.g., "squeaking") upon translation of the seatback pocket or otherwise cause undue friction between the coils 318, 322 and the receiving elements 330.

Alternatively, the receiving elements 330 may be keyed into the spreaders 314 to lock the pocket spring 306 against rotation about its axis. For example, the inner surfaces of the spreaders 314 may include a keyed groove or slot that has a shape and dimensions that are complementary with an end of the receiving element 330 such that the coils 318, 322 may be inserted onto each of the receiving elements 330, and then each of the receiving elements 330 may be inserted or twisted into the keyed groove or slot on the spreaders 314. In this manner, the coils 318, 322, in some embodiments, may lock against or partially into the static element (e.g., spreaders 314) using the receiving element 330. In one example, the extensions members 320, 324 may also be inserted into a complementary groove or slot in the receiving element 330 itself when the receiving element 330 is keyed into the spreader 314.

In some examples, dimensions of the receiving elements 330, such as the length of the receiving element 330 that extends from the inner surface of the spreader 334 and a diameter of the receiving element 330 may be determined based on the number of turns of the coils 318, 322 of the pocket spring 306 that are wrapped around the outer surface of the receiving element 330 as well as a diameter of the coils 318, 322. In some implementations, a shape and size of the receiving elements 330 can be configured to accept varied numbers of coils 318, 322 and/or coil diameters. In some examples, the number and/or diameter of the coils 318, 322 of the pocket spring 306 that surround each of the receiving elements 330 may be based on a desired amount of pre-load force exerted by the coils 318, 322 to maintain the seatback pocket 102 in the closed position. For example, the desired amount of pre-load force may be based on an estimated number of extensions and contractions of the coils 318, 322 of the pocket spring 306 over a lifetime of the aircraft seat 300 and/or characteristics of the wire that forms the pocket spring 306 (e.g., strength, elasticity).

Figure 4A:
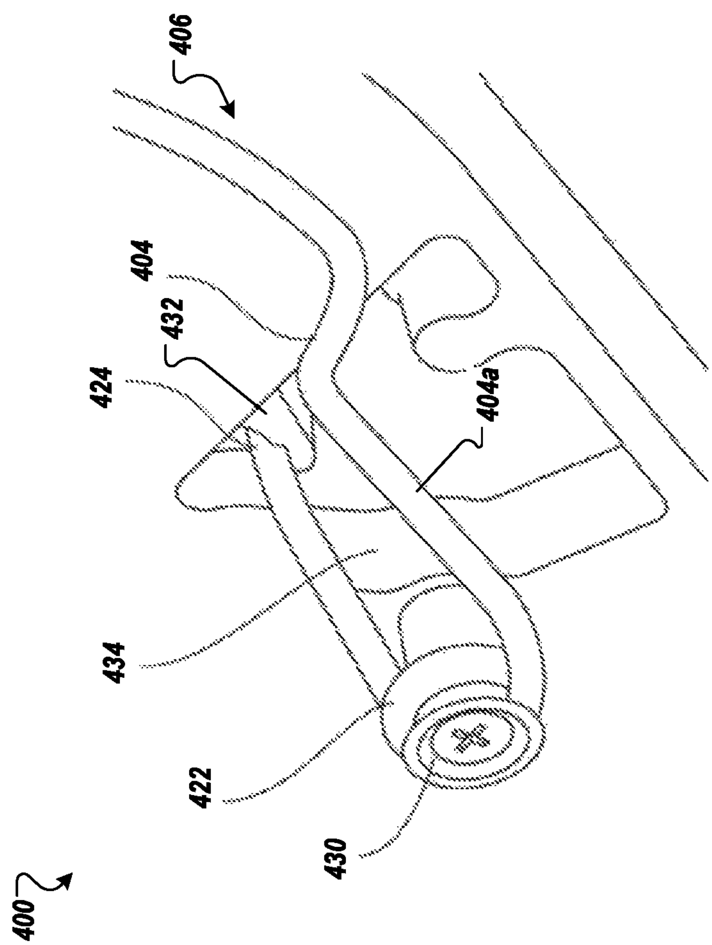
FIG. 4A is a fragmentary enlarged perspective view of an example pocket spring attached to spreaders of an aircraft passenger seat.
Figure 4B:
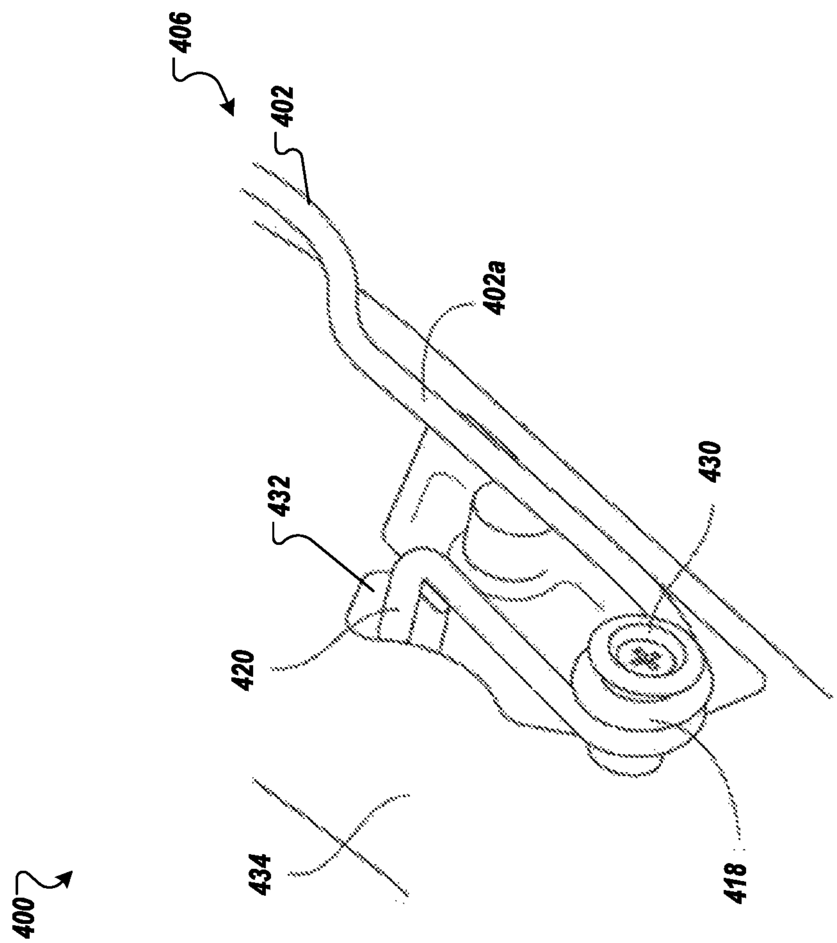
FIG. 4B is a fragmentary enlarged perspective view showing the interface between the coil and extension member of one end of an example pocket spring and an example spreader and bushing from a front side of the pocket spring.

FIGS. 4A and 4B provide an illustrative example of coils 418, 422 of a pocket spring 406 mounted to a static element (e.g., bushing) 430 on an inner surface of static elements 434 on either side of an aircraft seat 400. In some implementations, the pocket spring 406 shown in FIGS. 4A and 4B may be an implementation of the pocket springs 106, 206, or 306 described above. For example, FIG. 4A provides a zoomed in perspective view of a first arm 402 of a pocket spring 406 that includes an end portion 402*a* with a coil 418 mounted to the receiving element 430 on an inner surface of the static element 434. Similarly, FIG. 4B provides a zoomed in perspective view of a second arm 404 of the pocket spring 406 that includes a coil 422 mounted to the receiving element 430 on an inner surface of the static element 434. In some implementations, extension members 420, 424 on the first and second arms 402, 404 extend into contact points 432 such as complementary apertures, ribs, grooves, or slots that lock the pocket spring 406 against rotation about the axes formed by the receiving elements 430 and maintain the pre-loading force on the pocket spring 406.

Figure 5A:
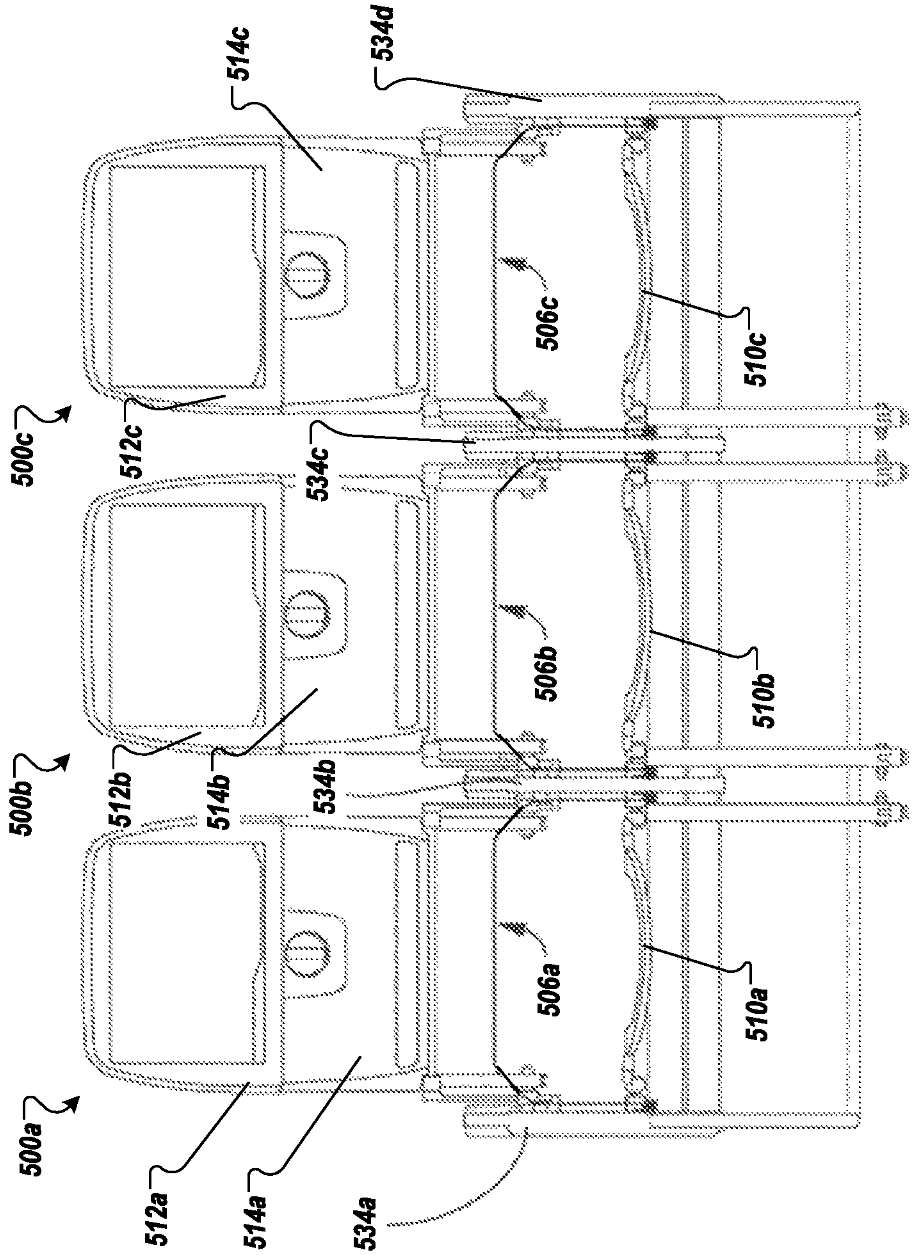
FIG. 5A is a rear plan view, looking forward, of a row three passenger seats equipped with example pocket springs.
Figure 5B:
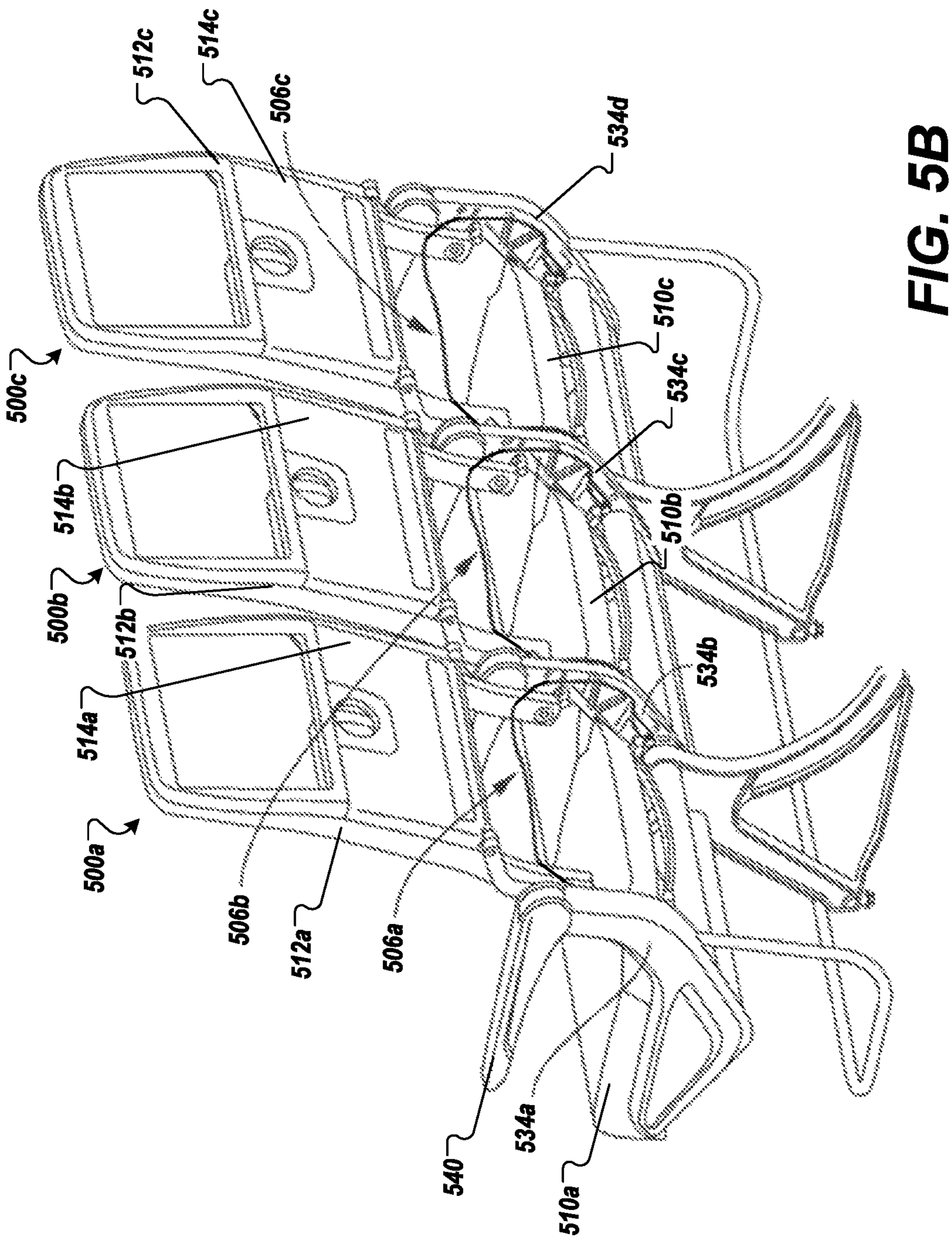
FIG. 5B is a rear perspective view of the seats shown in FIG. 5A.

FIGS. 5A and 5B provide an illustrative example of a row of aircraft seats 500 that have seatback pockets with pocket springs 506 as described above. In some implementations, the pocket springs 506 shown in FIGS. 5A and 5B may be an implementation of the pocket springs 106, 206, 306, or 406 described above. In some implementations, pocket springs 506 may be mounted to inner surfaces of spreaders 534, which separate the aircraft seats 500 within a row from one another. In some examples, the spreaders 534 may be mounted on either side of a seat bottom 510 of the aircraft seat 500 and may form a base of armrests 540 for the seats 500. In some examples, the pocket spring 506 may be positioned below a tray table 514 on a rear surface of the seatback 512.

Aspects of the present disclosure are directed to a pocket spring for a seatback pocket of an aircraft seat in which coils at the end of the spring are mounted to inner surfaces of the static elements such that an axis passing through the coils is perpendicular to a longitudinal axis of the aircraft cabin. In some implementations, each side of the pocket spring that is mounted to a respective static element may include a number turns of the coils that wrap axially around a receiving element affixed to an inner surface of the static element to provide spring force for maintaining the seatback pocket in a closed position where the pocket lies flat against a rear surface of the aircraft seat. In some examples, the number of spring coils that wrap around each of the receiving elements can vary based on a gauge of the wire, a height of the pocket, and an amount of desired spring force. Contrary to the pocket spring for the seatback pocket described above, conventional seat back pocket springs attach to the seat back and use wire coils whose axes are roughly parallel with the longitudinal axis of the aircraft cabin.

In some implementations, the configuration of the horizontally and perpendicularly mounted pocket spring uses less material than conventional pocket springs that are mounted to the seatback frame, which may reduce an overall weight of the aircraft seat. In addition, mounting the pocket spring to the static elements on either side of the aircraft seat (e.g., on left and right sides of the carriage assembly or on legs that support the seat frame of the aircraft seat) rather than to the seatback frame may increase an amount of clearance space between adjacent rows of aircraft seats, which provides additional legroom for passengers and/or allows additional rows of seats to be added to the aircraft.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft passenger seat including a seatback pocket, comprising:

a pocket spring configured to provide a pre-loaded spring force for holding the seatback pocket in a closed position against a rear surface of a seatback, the pocket spring comprising a first length of a wire extending between inner surfaces of a pair of static base frame members disposed on either side of the aircraft passenger seat in a substantially horizontal direction, the first length of the wire forming an upper edge of the seatback pocket, a pair of second lengths of wire extending from respective ends of the first length of wire in a substantially vertical direction, the pair of second lengths of wire forming side edges of the seatback pocket, a pair of coils each formed at a respective end of the pair of the second lengths of wire, each of the coils mounted to a respective receiving element disposed on a respective inner surface of the pair of static base frame members such that an axis of the pair of coils is aligned perpendicularly to the inner surfaces of the pair of static base frame members and generally parallel to the seatback, wherein at least one of a number of turns of each of the pair of coils surrounding the outer surface of the receiving element and a diameter of each of the pair of coils is selected based on an amount of pre-loaded force exerted by the pocket spring, and wherein each of the pair of coils surrounds an outer surface of the respective receiving element, the respective receiving element having a substantially cylindrical shape, and a pair of extension members extending from each of the pair of coils, each of the pair of extension members configured to contact a complementary contact point on inner surfaces of the static base frame members or additional static base frame members proximate to the static base frame members, the pair of extension members maintaining the pre-loaded spring force on the pair of coils; and a pocket panel configured to cover and enclose the pocket spring such that the pocket panel forms a pocket portion of the seatback pocket configured to hold one or more items.

2. The seatback pocket of claim 1, wherein the first length of wire includes one or more bends substantially equally spaced on either side of a centerline of the pocket spring, the one or more bends configured to provide an additional clearance distance between the seatback pocket and knees of a seated passenger.

3. The seatback pocket of claim 1, wherein an amount the pre-loaded spring force on the pair of coils is proportional to a length of each of the pair of extension members.

4. The seatback pocket of claim 1, wherein each of the pair of static base frame members comprises a portion of the seat carriage assembly including at least one of a seat spreader, a seat leg, or a lateral beam extending between passenger seats of a passenger seating group.

5. The seatback pocket of claim 1, wherein each of the pair of second lengths of wire extending from respective ends of the first length of wire is curved to provide clearance for each of the pair of extension members to contact the respective complementary contact point on the inner surfaces of the static base frame members.

6. The seatback pocket of claim 1, wherein the pre-loaded spring force of the pocket spring causes the pocket spring to automatically return to the closed position upon release of the pocket spring from an open position in which the pocket spring is pulled away from the rear surface of the seatback.

7. The seatback pocket of claim 1, wherein perpendicular alignment of the axis of the pair of coils to the pair of static base frame members causes each of the pair of coils to function as a torsion-spring coil.

8. The seatback pocket of claim 1, wherein the complementary contact point on the inner surfaces of the static base frame members include at least one of an aperture, rib, groove, or slot configured to lock the pocket spring against rotation about the receiving elements.

9. An aircraft passenger seat including a pocket spring for a seatback pocket configured to provide a pre-loaded spring force for holding the seatback pocket in a closed position against a rear surface of a seatback, the pocket spring comprising:

a first length of a wire extending between inner surfaces of a pair of static base frame members disposed on either side of the aircraft passenger seat in a substantially horizontal direction, the first length of the wire forming an upper edge of the seatback pocket, a pair of second lengths of wire extending from respective ends of the first length of wire in a substantially vertical direction, the pair of second lengths of wire forming side edges of the seatback pocket;

a pair of coils each formed at a respective end of the pair of the second lengths of wire, each of the coils mounted to a respective receiving element disposed on a respective inner surface of the pair of static base frame members such that an axis of the pair of coils is aligned perpendicularly to the inner surfaces of the pair of static base frame members and generally parallel to the seatback, wherein each of the pair of coils surrounds an outer surface of the respective receiving element, the receiving element having a substantially cylindrical shape, and wherein at least one of a number of turns of each of the pair of coils surrounding the outer surface of the bushing and a diameter of each of the pair of coils is selected based on an amount of pre-loaded force exerted by the pocket spring; and a pair of extension members extending from each of the pair of coils, each of the pair of extension members configured to contact a complementary contact point on inner surfaces of the static base frame members or additional static base frame members proximate to the static base frame members, the pair of extension members maintaining the pre-loaded spring force on the pair of coils.

10. The pocket spring of claim 9, wherein the first length of wire includes one or more bends substantially equally spaced on either side of a centerline of the pocket spring, the one or more bends configured to provide an additional clearance distance between the seatback pocket and knees of a seated passenger.

11. The pocket spring of claim 9, wherein an amount the pre-loaded spring force on the pair of coils is proportional to a length of each of the pair of extension members.

12. The pocket spring of claim 9, wherein each of the pair of static base frame members comprises a portion of the seat carriage assembly including at least one of a seat spreader, a seat leg, or a lateral beam extending between passenger seats of a passenger seating group.

13. The pocket spring of claim 9, wherein each of the pair of second lengths of wire extending from respective ends of the first length of wire is curved to provide clearance for each of the pair of extension members to make contact with the respective complementary contact point on the inner surfaces of the static base frame members.

14. The pocket spring of claim 9, wherein the pre-loaded spring force of the pocket spring causes the pocket spring to automatically return to the closed position upon release of the pocket spring from an open position in which the pocket spring is pulled away from the rear surface of the seatback.

15. The pocket spring of claim 9, wherein the perpendicular alignment of the axis of the pair of coils mounted to the inner surfaces of the pair of static base frame members causes each of the pair of coils to function as a torsion-spring coil.

16. The pocket spring of claim 9, wherein the complementary contact points on the inner surfaces of the static base frame members include at least one of an aperture, rib, groove, or slot configured to lock the pocket spring against rotation about axes of the receiving elements.

* * * * *